United States Patent
Ni et al.

(10) Patent No.: US 10,297,254 B2
(45) Date of Patent: May 21, 2019

(54) TASK INITIATION USING LONG-TAIL VOICE COMMANDS BY WEIGHTING STRENGTH OF ASSOCIATION OF THE TASKS AND THEIR RESPECTIVE COMMANDS BASED ON USER FEEDBACK

(71) Applicant: Google Inc., Mountain View, CA (US)

(72) Inventors: Yuzhao Ni, London (GB); Bo Wang, San Jose, CA (US); Barnaby James, Los Gatos, CA (US); Pravir Gupta, Los Gatos, CA (US); David Schairer, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/284,473

(22) Filed: Oct. 3, 2016

(65) Prior Publication Data
US 2018/0096681 A1    Apr. 5, 2018

(51) Int. Cl.
*G10L 15/00* (2013.01)
*G06F 17/30* (2006.01)
(Continued)

(52) U.S. Cl.
CPC ............ *G10L 15/22* (2013.01); *G10L 15/063* (2013.01); *G10L 15/1815* (2013.01);
(Continued)

(58) Field of Classification Search
CPC ............ G06F 17/30401; G06F 17/289; G06F 17/30672; G06F 3/167; G10L 15/22
(Continued)

(56) References Cited

U.S. PATENT DOCUMENTS

| 8,903,716 B2 | 12/2014 | Chen et al. |
|---|---|---|
| 2007/0136068 A1* | 6/2007 | Horvitz ................. G06F 17/289 704/270 |
| 2011/0047149 A1* | 2/2011 | Vaananen ......... G06F 17/30672 707/723 |
| 2011/0083154 A1* | 4/2011 | Boersma ............ H04N 21/4334 725/109 |

(Continued)

FOREIGN PATENT DOCUMENTS

CN    103778915    5/2014

OTHER PUBLICATIONS

Intellectual Property Office; Office Action issued in United Kingdom Application No. 1713938.7 dated Jan. 26, 2018.
(Continued)

*Primary Examiner* — Farzad Kazeminezhad
(74) *Attorney, Agent, or Firm* — Middleton Reutlinger

(57) ABSTRACT

In various implementations, upon receiving a given voice command from a user, a voice-based trigger may be selected from a library of voice-based triggers previously used across a population of users. The library may include association(s) between each voice-based trigger and responsive action(s) previously performed in response to the voice-based trigger. The selecting may be based on a measure of similarity between the given voice command and the selected voice-based trigger. One or more responsive actions associated with the selected voice-based trigger in the library may be determined. Based on the one or more responsive actions, current responsive action(s) may be performed by the client device. Feedback associated with performance of the current responsive action(s) may be received from the user and used to alter a strength of an association between the selected voice-based trigger and the one or more responsive actions, wherein the altering includes incrementing or decrementing a count corresponding to the strength of association based on the feedback being positive or negative respectively.

14 Claims, 4 Drawing Sheets

(51) Int. Cl.
- G06F 17/28 (2006.01)
- G10L 15/22 (2006.01)
- G10L 15/06 (2013.01)
- G10L 15/18 (2013.01)
- *G06F 3/16* (2006.01)
- *G10L 15/08* (2006.01)
- *G06F 16/242* (2019.01)
- *G06F 16/33* (2019.01)

(52) U.S. Cl.
CPC .......... *G10L 15/1822* (2013.01); *G06F 3/167* (2013.01); *G06F 16/243* (2019.01); *G06F 16/3338* (2019.01); *G06F 17/289* (2013.01); *G10L 2015/088* (2013.01); *G10L 2015/223* (2013.01); *G10L 2015/225* (2013.01)

(58) Field of Classification Search
USPC ................................. 704/254, 270; 707/723
See application file for complete search history.

(56) References Cited

U.S. PATENT DOCUMENTS

| | | | |
|---|---|---|---|
| 2011/0301955 A1* | 12/2011 | Byrne | G10L 15/22 704/251 |
| 2013/0325460 A1* | 12/2013 | Kim | G06F 3/167 704/231 |
| 2014/0108019 A1 | 4/2014 | Ehsani et al. | |
| 2015/0039292 A1 | 2/2015 | Suleman et al. | |
| 2015/0134337 A1* | 5/2015 | Seo | G06F 17/30401 704/254 |

OTHER PUBLICATIONS

Intellectual Property Office of Singapore—International Searching Authority; Written Opinion of PCT Ser. No. PCT/US2017/050319; dated Feb. 8, 2018.

* cited by examiner

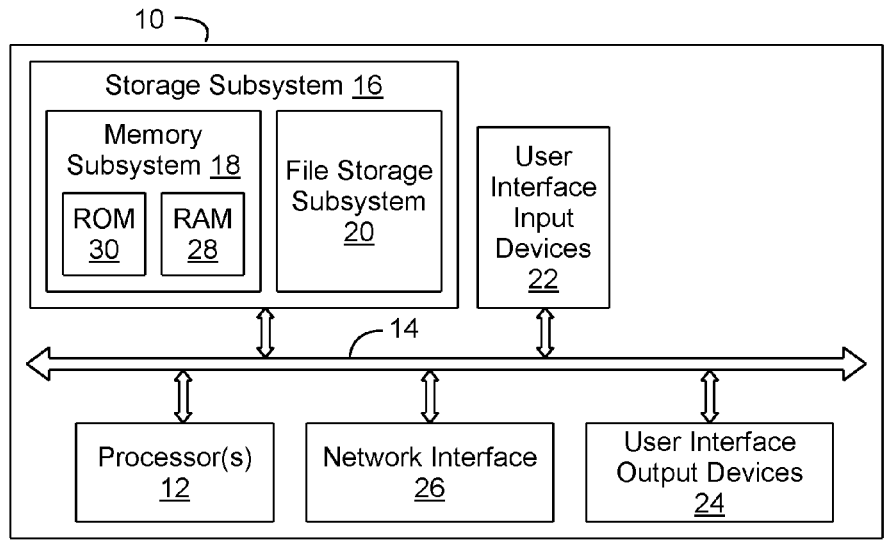
FIG. 1
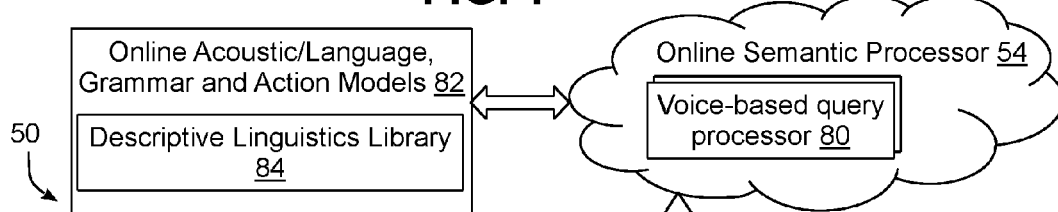
FIG. 2
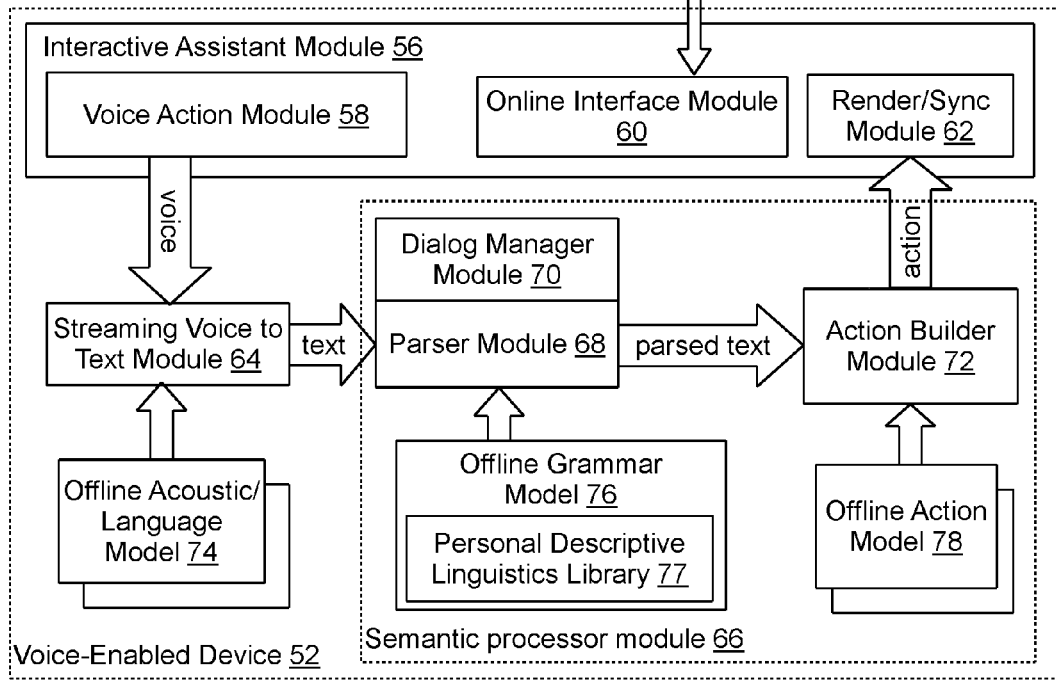

TASK INITIATION USING LONG-TAIL VOICE COMMANDS BY WEIGHTING STRENGTH OF ASSOCIATION OF THE TASKS AND THEIR RESPECTIVE COMMANDS BASED ON USER FEEDBACK

BACKGROUND

Interactive assistant modules are software processes installed on computing devices such as smart phones, tablets, vehicle navigation systems, standalone voice-activated products, and smart watches to provide user-friendly interfaces for users to issue natural language commands and/or engage in dialog with the interactive assistant module, gestures, facial expressions, etc. Users often issue natural language commands using their voices, but interactive assistant modules may respond to other modalities as well, such as various forms of textual input. Grammars employed by existing interactive assistant modules tend to be developed using so-called "prescriptive linguistic" approaches, which are concerned with how a language should be used, rather than how it is actually used. Consequently, existing grammars only provide users with limited flexibility in issuing voice-based commands. If a user's voice command deviates too much from existing grammars—e.g., because the user issues a so-called "long tail" voice command—the voice command may not be recognized. It may be possible to create associations between arbitrary, voice-based triggers (i.e., voice-based triggers) and responsive actions, but this may require users to manually create such associations, e.g., using a graphical user interface or by engaging in extensive dialog with an interactive assistant module. Moreover, slight deviation between an issued voice command and a voice-based trigger may lead to the voice-based trigger not being recognized.

SUMMARY

This specification is directed generally to various techniques for leveraging associations between existing voice-based triggers and responsive actions used across a population of users to automatically determine which responsive action(s) to take in response to a given voice command (e.g., a long-tail voice command) received at a client device from a user. In various implementations, a user's voice command may be received at an audio input device (e.g., a microphone) of a client device, such as a smart phone, smart watch, vehicle computing system (e.g., navigational system, vehicle media control system, etc.). In some implementations, the given voice command may be converted into text that includes one or more tokens, e.g., using various natural language processing techniques. However, for purposes of this disclosure, this conversion will not be discussed in detail.

In various implementations a so-called "descriptive linguistics library" of voice-based triggers previously used by one or more other users may be searched for a voice-based trigger that is similar (syntactically and/or semantically) to the given voice input. As used herein and elsewhere, "descriptive linguistics" refers to the study of the grammar, classification, and arrangement of the features of a language as the language is actually used at a given time, as opposed to "prescriptive linguistics" which refers to how a language should be used. Thus, the descriptive linguistics library may, in effect, define one or more grammars that evolve with the language to handle colloquialisms, slang, and/or various dialects that might not otherwise be captured by a grammar created using prescriptive linguistic approaches.

In various implementations, the descriptive linguistics library may include one or more associations between each voice-based trigger and one or more responsive actions performable in response to the voice-based trigger. For example, one or more prior users may have created an association between a voice-based trigger such as "back to the mines" and a responsive action such as launching a navigation app to find the quickest route (e.g., lowest traffic, shortest distance, etc.) to work. In various implementations, these associations between existing voice-based triggers and responsive actions may have strengths or weights that are based on, among other things, the number of users who have created and/or utilized such associations. Thus, for example, a single voice-based trigger such as "I need a pick me up" may be associated with multiple responsive actions, such as streaming inspirational music, speaking (by an interactive assistant module) a joke of the day, finding the nearest coffee shop, and so forth. Each of these associations may have a strength that is based on, for example, a number of times the phrase was used to trigger the respective responsive actions, a percentage of times the voice-based trigger was used to trigger one particular responsive action versus another, and so forth.

Based on the given voice command received from the user (and possibly other signals described below), a voice-based trigger may be selected from the descriptive linguistics library. In some implementations, this selection may be based on a semantic and/or syntactic similarity measure calculated based on the given voice command and the selected voice-based trigger. Then, one or more current responsive actions associated with the selected voice-based trigger may be selected and performed by the user's client device.

In some implementations, the user's client device may have the exact same application(s) installed (or even a different version of the same application) as were used on another client device to perform responsive actions associated with the selected voice-based trigger. In such case, the same application(s) may be launched to perform the responsive action(s). However, in other implementations, the user's client device may not have the exact same application(s) installed. In such a scenario, the client device may analyze a plurality of applications installed on the client device to identify one or more "analogous" applications to perform the responsive action(s). "Analogous" applications may be applications that perform the same or similar functionality, but may be released by different developers, etc. For example different map applications are capable of providing real-time navigation. Different email applications are capable of allowing users to read, send, and receive emails. Different users may use different calendar applications (local and/or online). Different media applications are capable of playing locally-stored, and/or streaming from online sources, music and/or videos. And so forth.

Similarly, in some implementations, one or more terms/tokens in an issued voice-based command may not be exactly applicable for a particular user and/or context. In such instances, "analogous" terms may be determined, e.g., by parser module 68, that are more directly applicable. For example, suppose the client device at which the voice command is issued is located in a different geographic region than were client devices at which existing voice-based triggers were used previously. In such a scenario, one or more terms of a voice-based command issued at the client device may be mapped/matched to different, "analogous"

terms/tokens than were returned in response to existing voice-based triggers. Suppose a user says, "I sure could go for some waffles." If the user is located in one region of a country, a first waffle restaurant chain may be prevalent, and therefore may be used as a parameter for the issued request and/or returned in response thereto. However, if the user is located in another region of the country in which a second waffle restaurant chain is prevalent, then that second waffle restaurant chain may be used instead. Similar techniques may be employed to times (e.g., users in different time zones), people, activities, and so forth. For example, a particular term and/or phrase may refer to a first activity in one region and a second activity in another region. Suppose a user says, "I want to watch some football" to his or her voice-activated standalone product. In the United States, the term "football" may be matched, e.g., by parser module 68, to voice-based triggers associated with American Rules Football. However, if this command is issued elsewhere in the world, the term "football" command may be matched to voice-based triggers associated with the sport referred to in the United States as "soccer," but referred to elsewhere as "football."

In various implementations, feedback associated with the client device performing the one or more current responsive actions may be provided by a user. This feedback may be used to strengthen and/or weaken associations between existing voice-based triggers and responsive action(s), locally at the user's client device and/or in the descriptive linguistics library. In this manner, the system may "learn" over time what colloquialisms, dialects, and/or slang terms/phrases are used by different users in different regions to trigger various responsive actions. The more the system learns, the more robust its grammar becomes, and the better equipped the system may be to respond to a particular user's long-tail voice command to initiate some responsive action.

Suppose a user says, "I need a pick-me-up." Based on prior responsive actions performed in response to a best matching voice-based trigger of the descriptive linguistic library, the user's client device may open up a music playing application to a streaming music station that plays inspirational and/or fun-go-lucky music. However, the user may provide negative feedback, either by closing the music playing application immediately or by explicitly providing negative feedback (e.g., in response to a prompt such as "Is this what you wanted when you said you needed to pick-me-up?"). Based on such feedback, an association between the selected voice-based trigger and the responsive action(s) may be weakened. This may occur locally at the client device and/or remotely, e.g., in the descriptive linguistics library. In some implementations, whatever alternative responsive action(s) the user initiates instead (e.g., find directions to the nearest coffee shop) may be used to create a new association (or to strengthen an existing online association) between the voice-based trigger "I need a pick-me-up" and the alternative responsive action(s).

In some implementations, other signals may be used, in addition to and/or instead of semantic/syntactic similarity measure, to match a given voice command used by an individual to one or more voice-based triggers and/or responsive actions. In some implementations, one or more attributes of the user and/or a client device operated by the user (e.g., the user's "context") may be taken into consideration. For example, there may be multiple associations in the descriptive linguistics library between the phrase "crank up the air" and various responsive actions. However, one or more signals from a user's client device may be used to disambiguate between the various associations. Suppose one or more sensors of a user's smart phone detects that the user is travelling in a vehicle, or if the user issues the command to an interactive assistant module operating on a vehicle computing system. In such a scenario, the voice-based trigger "crank up the air" may be matched to responsive actions such as turning up the vehicle's air conditioning. By contrast, if one or more sensors of the user's smart phone detects that the user is at home, the voice-based trigger "crank up the air" may be matched to responsive actions such as adjusting a smart thermostat in the user's home to turn up the home's air conditioning.

Therefore, in some implementations, a method may include: receiving, at a client device, a given voice command from a user; selecting, from a library of voice-based triggers previously used across a population of users, a selected voice-based trigger, wherein the library includes one or more associations between each voice-based trigger and one or more responsive actions previously performed in response to the voice-based trigger, and wherein the selecting is based at least in part on a measure of similarity between the given voice command and the selected voice-based trigger; determining one or more responsive actions associated with the selected voice-based trigger in the library; selecting, by the client device, one or more current responsive actions to be performed by the client device based on the one or more responsive actions; performing, by the client device, the one or more current responsive actions; receiving, by the client device from the user, feedback associated with the client device performing the one or more current responsive actions; and altering a strength of an association between the selected voice-based trigger and the one or more responsive actions based on the feedback.

In various implementations, the one or more current responsive actions may be the same as the one or more responsive actions. In various implementations, the one or more current responsive actions may be analogous to the one or more responsive actions. In various implementations, the selected voice-based trigger includes one or more terms or tokens that are analogous to one or more terms or tokens in the given voice command. In various implementations, the method may further include analyzing a plurality of applications installed on the client device to identify one or more applications to perform the one or more current responsive actions.

In various implementations, the altering may include weakening the association between the selected voice-based trigger and the one or more responsive actions based on the feedback. In various implementations, the altering may include strengthening the association between the selected voice-based trigger and the one or more responsive actions based on the feedback.

In various implementations, the measure of similarity may be a measure of syntactic similarity. In various implementations, the measure of similarity may be a measure of semantic similarity. In various implementations, the selected voice-based trigger may be selected from the library of voice-based triggers further based on a context of the user detected using one or more sensors of the client device.

In various implementations, determining the one or more responsive actions associated with the selected voice-based trigger in the library may include selecting at least one responsive action from a plurality of candidate responsive actions associated with the selected voice-based trigger in the library. In various implementations, the at least one responsive action may be selected based on a context of the user detected using one or more sensors of the client device.

In various implementations, the given voice command fails to specify at least one parameter required by the one or more current responsive actions, and the method further includes identifying, based on a context of the user detected using one or more sensors of the client device, a value to use as the at least one parameter. In various implementations, the given voice command fails to specify at least one parameter required by the one or more current responsive actions, and the method further includes identifying, based on a personal library associated with the user, a value to use as the at least one parameter.

In another aspect, a method may include: receiving, from a population of users, a plurality of voice-based triggers and current responsive actions performed at client devices operated by users of the population of users in response to the voice-based triggers; storing associations between the voice-based triggers and the responsive actions in a library, wherein the associations are endorsed by a population of users; receiving a new voice command provided by a given user at a given client device; selecting, from the library of voice-based triggers, a selected voice-based trigger, wherein the selecting is based at least in part on a measure of similarity between the new voice command and the selected voice-based trigger; determining one or more responsive actions associated with the selected voice-based trigger in the library; selecting one or more current responsive actions to be performed by the given client device based on the one or more responsive actions; receiving, by the client device from the user, feedback associated with the given client device performing the one or more current responsive actions; and altering a strength of an association between the selected voice-based trigger and the one or more responsive actions based on the feedback.

In addition, some implementations include an apparatus including memory and one or more processors operable to execute instructions stored in the memory, where the instructions are configured to perform any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 1 illustrates an example architecture of a computer system.

FIG. 2 is a block diagram of an example distributed voice input processing environment.

DETAILED DESCRIPTION

Figure 3:
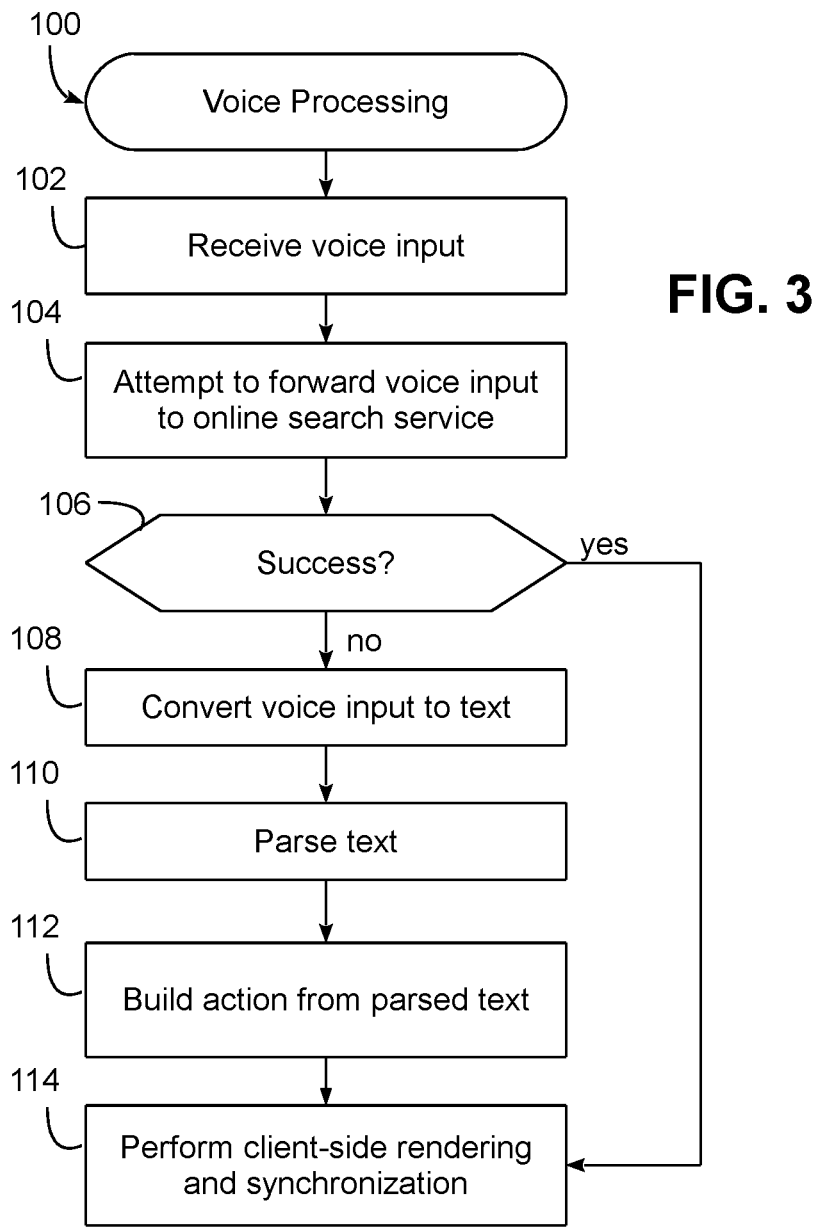
FIG. 3 is a flowchart illustrating an example method of processing a voice input using the environment of FIG. 2.

Now turning to the drawings, wherein like numbers denote like parts throughout the several views, FIG. 1 is a block diagram of electronic components in an example computer system 10. System 10 typically includes at least one processor 12 that communicates with a number of peripheral devices via bus subsystem 14. These peripheral devices may include a storage subsystem 16, including, for example, a memory subsystem 18 and a file storage subsystem 20, user interface input devices 22, user interface output devices 24, and a network interface subsystem 26. The input and output devices allow user interaction with system 10. Network interface subsystem 26 provides an interface to outside networks and is coupled to corresponding interface devices in other computer systems.

In some implementations, user interface input devices 22 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 10 or onto a communication network.

User interface output devices 24 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 10 to the user or to another machine or computer system.

Storage subsystem 16 stores programming and data constructs that provide the functionality of some or all of the modules described herein. For example, the storage subsystem 16 may include the logic to perform selected aspects of the methods disclosed hereinafter.

These software modules are generally executed by processor 12 alone or in combination with other processors. Memory subsystem 18 used in storage subsystem 16 may include a number of memories including a main random access memory (RAM) 28 for storage of instructions and data during program execution and a read only memory (ROM) 30 in which fixed instructions are stored. A file storage subsystem 20 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 20 in the storage subsystem 16, or in other machines accessible by the processor(s) 12.

Bus subsystem 14 provides a mechanism for allowing the various components and subsystems of system 10 to communicate with each other as intended. Although bus subsystem 14 is shown schematically as a single bus, alternative implementations of the bus subsystem may use multiple busses.

System 10 may be of varying types including a mobile device, a portable electronic device, an embedded device, a desktop computer, a laptop computer, a tablet computer, a wearable device, a workstation, a server, a computing cluster, a blade server, a server farm, or any other data processing system or computing device. In addition, functionality implemented by system 10 may be distributed among multiple systems interconnected with one another over one or more networks, e.g., in a client-server, peer-to-peer, or other networking arrangement. Due to the ever-changing nature of computers and networks, the description of system 10 depicted in FIG. 1 is intended only as a specific example for purposes of illustrating some implementations. Many other configurations of system 10 are possible having more or fewer components than the computer system depicted in FIG. 1.

Implementations discussed hereinafter may include one or more methods implementing various combinations of the functionality disclosed herein. Other implementations may include a non-transitory computer readable storage medium storing instructions executable by a processor to perform a method such as one or more of the methods described herein. Still other implementations may include an apparatus including memory and one or more processors operable to execute instructions, stored in the memory, to perform a method such as one or more of the methods described herein.

Various program code described hereinafter may be identified based upon the application within which it is implemented in a specific implementation. However, it should be appreciated that any particular program nomenclature that follows is used merely for convenience. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that some implementations may not be limited to the specific organization and allocation of program functionality described herein.

Furthermore, it will be appreciated that the various operations described herein that may be performed by any program code, or performed in any routines, workflows, or the like, may be combined, split, reordered, omitted, performed sequentially or in parallel and/or supplemented with other techniques, and therefore, some implementations are not limited to the particular sequences of operations described herein.

FIG. 2 illustrates an example distributed voice input processing environment 50, e.g., for use with a voice-enabled device 52 in communication with an online service such as online semantic processor 54. In the implementations discussed hereinafter, for example, voice-enabled device 52 is described as a mobile device such as a cellular phone or tablet computer. Other implementations may utilize a wide variety of other voice-enabled devices, however, so the references hereinafter to mobile devices are merely for the purpose of simplifying the discussion hereinafter. Countless other types of voice-enabled devices may use the herein-described functionality, including, for example, laptop computers, watches, head-mounted devices, virtual or augmented reality devices, other wearable devices, audio/video systems, navigation systems, automotive and other vehicular systems, standalone voice-activated products, etc. Moreover, many of such voice-enabled devices may be considered to be resource-constrained in that the memory and/or processing capacities of such devices may be constrained based upon technological, economic or other reasons, particularly when compared with the capacities of online or cloud-based services that can devote virtually unlimited computing resources to individual tasks. Some such devices may also be considered to be offline devices to the extent that such devices may be capable of operating "offline" and unconnected to an online service at least a portion of time, e.g., based upon an expectation that such devices may experience temporary network connectivity outages from time to time under ordinary usage.

Online semantic processor 54 in some implementations may be implemented as a cloud-based service employing a cloud infrastructure, e.g., using a server farm or cluster of high performance computers running software suitable for handling high volumes of requests from multiple users. Online semantic processor 54 may not be limited to voice-based requests, and may also be capable of handling other types of requests, e.g., text-based requests, image-based requests, etc. In some implementations, online semantic processor 54 may handle voice-based requests such as setting alarms or reminders, managing lists, initiating communications with other users via phone, text, email, etc., or performing other actions that may be initiated via voice input. For the purposes of this disclosure, voice-based requests and other forms of voice input may be collectively referred to as voice commands, regardless of whether the voice commands seek to initiate a search, pose a question, issue a command, etc. In general, therefore, any voice input, e.g., including one or more words or phrases, may be considered to be a voice command within the context of the illustrated implementations.

In the implementation of FIG. 2, voice input received by voice-enabled device 52 is processed by a voice-enabled application (or "app"), which in FIG. 2 takes the form of an interactive assistant module 56. In other implementations, voice input may be handled within an operating system or firmware of voice-enabled device 52. Interactive assistant module 56 in the illustrated implementation includes a voice action module 58, online interface module 60 and render/synchronization module 62. Voice action module 58 receives voice input directed to interactive assistant module 56 and coordinates the analysis of the voice input and performance of one or more actions for a user of the voice-enabled device 52. Online interface module 60 provides an interface with online semantic processor 54, including forwarding voice input to online semantic processor 54 and receiving responses thereto.

Render/synchronization module 62 manages the rendering of a response to a user, e.g., via a visual display, spoken audio, or other feedback interface suitable for a particular voice-enabled device. In addition, in some implementations, module 62 also handles synchronization with online semantic processor 54, e.g., whenever a response or action affects data maintained for the user in the online search service (e.g., where voice input requests creation of an appointment that is maintained in a cloud-based calendar).

Interactive assistant module 56 may rely on various middleware, framework, operating system and/or firmware modules to handle voice input, including, for example, a streaming voice to text module 64 and a semantic processor module 66 including a parser module 68, dialog manager module 70 and action builder module 72.

Streaming voice to text module 64 receives an audio recording of voice input, e.g., in the form of digital audio data, and converts the digital audio data into one or more text words or phrases (also referred to herein as "tokens"). In the illustrated implementation, module 64 is also a streaming module, such that voice input is converted to text on a token-by-token basis and in real time or near-real time, such that tokens may be output from module 64 effectively concurrently with a user's speech, and thus prior to a user enunciating a complete spoken request. Module 64 may rely on one or more locally-stored offline acoustic and/or language models 74, which together model a relationship between an audio signal and phonetic units in a language, along with word sequences in the language. In some implementations, a single model 74 may be used, while in other implementations, multiple models may be supported, e.g., to support multiple languages, multiple speakers, etc.

Whereas module 64 converts speech to text, module 66 attempts to discern the semantics or meaning of the text output by module 64 for the purpose or formulating an appropriate response. Parser module 68, for example, relies on one or more offline grammar models 76 to map text to particular actions and to identify attributes that constrain the performance of such actions, e.g., input variables or parameters to such actions. In some implementations, a single model 76 may be used, while in other implementations, multiple models may be supported, e.g., to support different actions or action domains (i.e., collections of related actions such as communication-related actions, search-related actions, audio/visual-related actions, calendar-related actions, device control-related actions, etc.). As will be discussed more below, a "personal descriptive linguistic library" 77 may be included with model 76 for use by interactive assistant module 56 to perform techniques described herein. Additionally, in some implementations, "analogous" responsive actions and/or voice command parameters may be determined by parser module 68, e.g., using one or more models 76 and/or personal descriptive linguistics library 77.

As an example, an offline grammar model 76 may support an action such as "set a reminder" having a reminder type parameter that specifies what type of reminder to set, an item parameter that specifies one or more items associated with the reminder, and a time parameter that specifies a time to activate the reminder and remind the user. Parser module 64 may receive a sequence of tokens such as "remind me to," "pick up," "bread," and "after work" and map the sequence of tokens to the action of setting a reminder with the reminder type parameter set to "shopping reminder," the item parameter set to "bread" and the time parameter of "5:00 pm,", such that at 5:00 pm that day the user receives a reminder to "buy bread."

Parser module 68 may also work in conjunction with a dialog manager module 70 that manages a dialog with a user. A dialog, within this context, refers to a set of voice inputs and responses similar to a conversation between two individuals. Module 70 therefore maintains a "state" of a dialog to enable information obtained from a user in a prior voice input to be used when handling subsequent voice inputs. Thus, for example, if a user were to say "remind me to pick up bread," a response could be generated to say "ok, when would you like to be reminded?" so that a subsequent voice input of "after work" would be tied back to the original request to create the reminder. In some implementations, module 70 may be implemented as part of interactive assistant module 56.

Action builder module 72 receives the parsed text from parser module 68, representing a voice input interpretation and generates one or more responsive actions or "tasks" along with any associated parameters for processing by module 62 of interactive assistant module 56. Action builder module 72 may rely on one or more offline action models 78 that incorporate various rules for creating actions from parsed text. It will be appreciated that some parameters may be directly received as voice input, while some parameters may be determined in other manners, e.g., based upon a user's location, demographic information, or based upon other information particular to a user. For example, if a user were to say "remind me to pick up bread at the grocery store," a location parameter may not be determinable without additional information such as the user's current location, the user's known route between work and home, the user's regular grocery store, etc.

As noted above, in some implementations, interactive assistant module 56 may receive voice commands from a user and use various offline and online resources to initiate one or more responsive tasks. When a user provides a long-tail voice command to the interactive assistant module 56 to initiate a task, action builder module 72 may match the long-tail voice command to one or more existing voice-based triggers (semantically and/or syntactically), and may select and perform (or cause to be performed) one or more responsive actions.

It will be appreciated that in some implementations, models 74, 76 and 78 may be combined into fewer models or split into additional models, as may be functionality of modules 64, 68, 70 and 72. Moreover, models 74-78 are referred to herein as offline models insofar as the models are stored locally on voice-enabled device 52 and are thus accessible offline, when device 52 is not in communication with online semantic processor 54. Moreover, while module 56 is described herein as being an interactive assistant module, that is not meant to be limiting. In various implementations, any type of app operating on voice-enabled device 52 may perform techniques described herein to perform responsive actions in response to user-issued long-tail voice commands.

In various implementations, online semantic processor 54 may include complementary functionality for handling voice input, e.g., using a voice-based query processor 80 that relies on various acoustic/language, grammar and/or action models 82, including the so-called "descriptive linguistics library" 84 that is described in more detail elsewhere herein. It will be appreciated that in some implementations, particularly when voice-enabled device 52 is a resource-constrained device, voice-based query processor 80 and models 82 used thereby may implement more complex and computational resource-intensive voice processing functionality than is local to voice-enabled device 52.

In some implementations, multiple voice-based query processors 80 may be employed, each acting as an online counterpart for one or more individual personal assistant modules 56. For example, in some implementations, each device in a user's ecosystem may be configured to operate an instance of a interactive assistant module 56 that is associated with the user (e.g., configured with the user's preferences, associated with the same interaction history, etc.). A single, user-centric online instance of voice-based query processor 80 may be accessible to each of these multiple instances of interactive assistant module 56, depending on which device the user is operating at the time.

In some implementations, both online and offline functionality may be supported, e.g., such that online functionality is used whenever a device is in communication with an online service, while offline functionality is used when no connectivity exists. In other implementations different actions or action domains may be allocated to online and offline functionality, and while in still other implementations, online functionality may be used only when offline functionality fails to adequately handle a particular voice input. In other implementations, however, no complementary online functionality may be used.

FIG. 3, for example, illustrates a voice processing routine 100 that may be executed by voice-enabled device 52 to handle a voice input. Routine 100 begins in block 102 by receiving voice input, e.g., in the form of a digital audio signal. In this implementation, an initial attempt is made to forward the voice input to the online search service (block 104). If unsuccessful, e.g., due to a lack of connectivity or a lack of a response from the online search service, block 106 passes control to block 108 to convert the voice input to text tokens (block 108, e.g., using module 64 of FIG. 2), parse the text tokens (block 110, e.g., using module 68 of FIG. 2), and build an action from the parsed text (block 112, e.g., using module 72 of FIG. 2). The resulting action is then used to perform client-side rendering and synchronization (block 114, e.g., using module 62 of FIG. 2), and processing of the voice input is complete.

Returning to block 106, if the attempt to forward the voice input to the online search service is successful, block 106 bypasses blocks 108-112 and passes control directly to block 114 to perform client-side rendering and synchronization. Processing of the voice input is then complete. It will be appreciated that in other implementations, as noted above, offline processing may be attempted prior to online processing, e.g., to avoid unnecessary data communications when a voice input can be handled locally.

Figure 4:
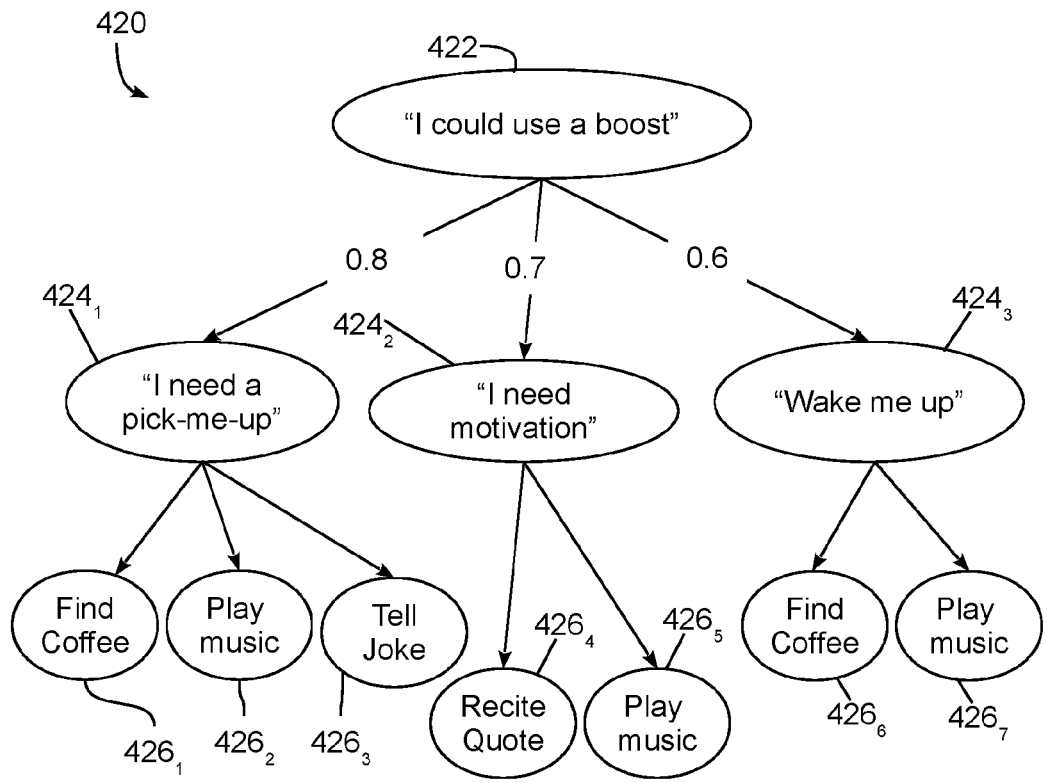
FIG. 4 illustrates an example of how techniques described herein may be implemented in a particular scenario.

FIG. 4 schematically demonstrates an example scenario 420 of how interactive assistant module 56, alone or in conjunction with a counterpart online voice-based processor 80, may determine what action(s) to perform in response to a long-tail voice command 422 of "I could use a boost." The voice command 422 may first be compared to a plurality of existing voice-based triggers, e.g., previously used across a population of users, which may or may not be stored in descriptive linguistics library 84 forming part of online acoustic/language grammar and action models 82, to select one or more voice-based triggers that best match voice command 422. For example, in FIG. 4, the three most similar voice-based triggers are "I need a pick-me-up" ($424_1$), "I need motivation" ($424_2$), and "Wake me up" ($424_3$). The library 84 may contain numerous other voice-based triggers, but these three are depicted in FIG. 4 for illustrative purposes.

Each voice-based trigger 424 is connected by an edge to voice command 422, and each edge is depicted with a corresponding similarity measure. For example, first voice-based trigger $424_1$ has a similarity score of 0.8 with voice command 422, second voice-based trigger $424_2$ has a similarity score of 0.7 with voice command 422, and third voice-based trigger $424_3$ has a similarity score of 0.6 with voice command 422. As noted above, these similarity measures may be calculated in various ways, and may reflect semantic and/or syntactic similarity between voice command 422 and voice-based triggers $424_{1-3}$.

Below voice-based triggers $424_{1-3}$ are associated candidate responsive actions 426. Associations between voice-based triggers $424_{1-3}$ and responsive actions $426_{1-2}$ may be stored in the aforementioned descriptive linguistics library 84, e.g., as connecting database fields, as distinct rows (e.g., one row for each candidate responsive action), and/or using other techniques. First voice-based trigger $424_1$ includes three candidate responsive actions: find a coffee shop (e.g., by launching a navigation application) $426_1$; play music (e.g., stream inspirational music, play the user's favorite song, etc.) $426_2$; and tell a joke (e.g., interactive assistant module "speaks" a randomly selected joke or a joke of the day) $426_3$. Second voice-based trigger $424_2$ includes two candidate responsive actions: recite an inspirational or motivating quote (e.g., interactive assistant module "speaks" a randomly selected quote or a quote of the day) $426_4$; and play music $426_5$. Third voice-based trigger $424_3$ includes two candidate responsive actions: find a coffee shop $426_6$; and play music $426_7$.

In some implementations, when the user issues voice command 422, the voice-based trigger 424 that is most similar to voice command 422 (i.e., has the greatest similarity measure) may be selected without further consideration. If such a technique is applied to scenario 420 of FIG. 4, first voice-based trigger $424_1$ may be selected because it has the highest similarity score (0.8). Then, an associated responsive action 426 may be selected from candidate responsive actions $426_{1-3}$.

In some implementations, the responsive action that was previously performed by the greatest number of prior users, or by the greatest percentage of prior users, may be selected. In other implementations, a user's context may be detected, e.g., using one or more sensors of voice-enabled device 52, and used to select which candidate responsive action 426 to perform. For example, if the client device detects that the user issued voice command 422 early in the morning while the user is commuting to work, interactive assistant module 56 may be most likely to perform the action of finding a coffee shop ($426_1$). However, if the user is already at work (and hence less likely to leave work to obtain coffee), interactive assistant module 56 may perform the responsive action of playing music ($426_2$). If the user issues voice command 422 late at night, e.g., when the user is unlikely to want coffee or play music, interactive assistant module 56 may perform the responsive action of telling a joke ($426_3$). As another example, if the user's client device detects (e.g., using a position coordinate sensor, public Wi-Fi connection, recent electronic wallet purchase history, etc.) that the user has just recently consumed coffee or is in or just outside of a coffee shop, interactive assistant module 56 may eliminate the responsive action of finding a coffee shop ($426_1$) from consideration.

In some implementations, the impact a user's context has on which responsive action is performed may be determined based at least in part on similarities with contexts of prior users when they triggered the responsive actions 426 in response to voice-based triggers 424. Thus, for instance, when prior users said "I need a pick-me-up" in the morning, they may have most often meant that they wanted coffee, whereas when prior users said the same thing at night, they may have more often meant they needed to be cheered up (e.g., with a joke).

Additionally or alternatively, in some implementations, a user's context (as determined by one or more sensors of a client device, for instance) may be used to select from among a plurality of voice-based triggers 424. Suppose no candidate responsive actions associated with a first voice-based trigger make sense given a user's current context. In such a scenario, a second voice-based trigger may be selected instead, even though the first voice-based trigger may have yielded a greater similarity measure to the user's issued voice command that the second voice-based trigger.

Figure 5:
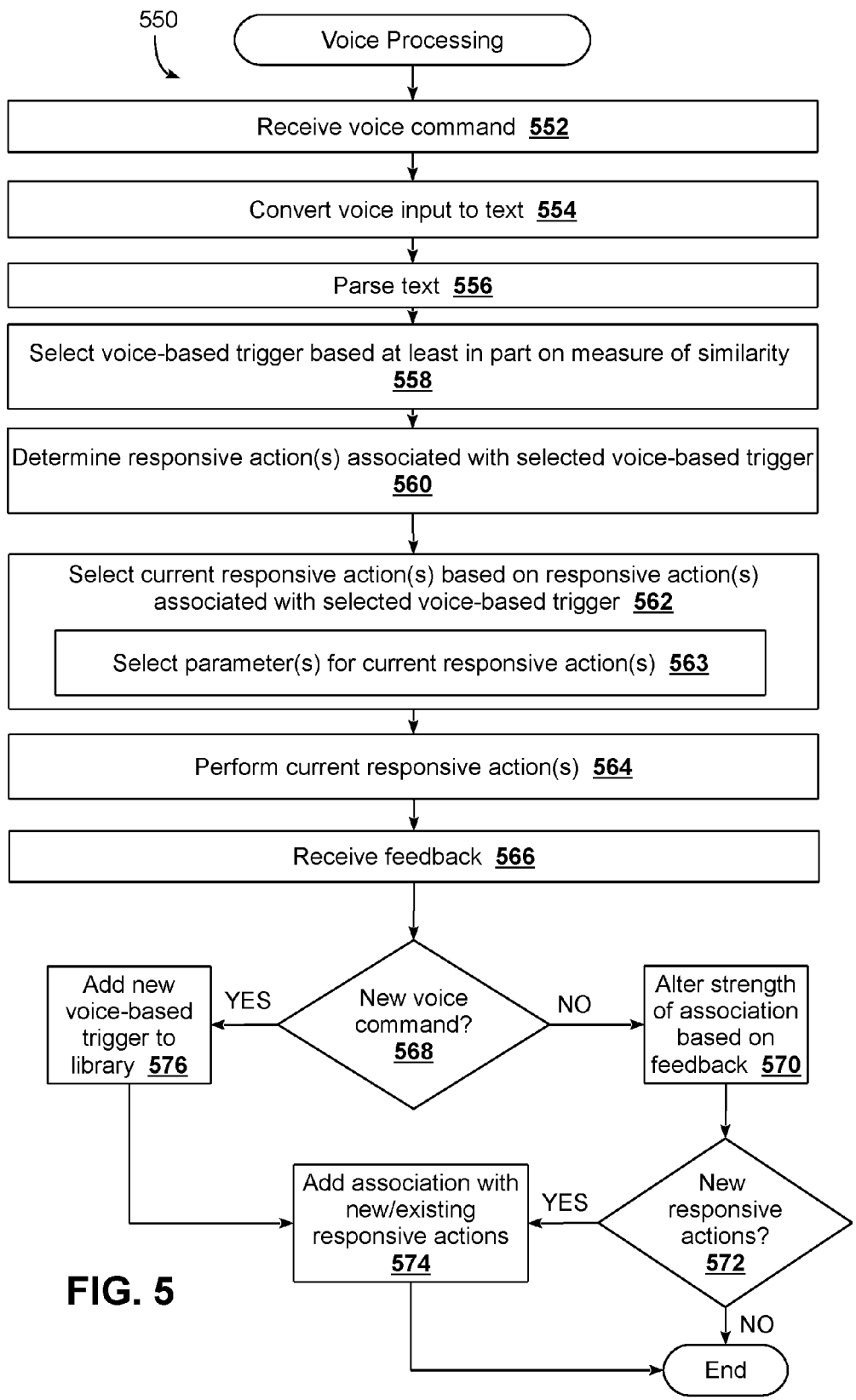
FIG. 5 is a flowchart illustrating an example method of practicing techniques described herein.

FIG. 5 illustrates a routine 550 suitable for leveraging existing associations between voice-based triggers and responsive actions used across a population of users to automatically determine which responsive action(s) to take in response to a given voice command received at a client device from a user. Routine 550 may be executed by the same service that processes voice-based queries, or may be a different service altogether.

Blocks 552-556 of routine 550 are similar to various blocks of routine 100 depicted in FIG. 3. At block 552, voice command is received, e.g., in the form of a digital audio signal. At block 554, the voice input is converted to text tokens (e.g., using module 64 and/or model 82 of FIG. 2). At block 556, the text tokens may be parsed (e.g., using module 68 and/or model 82 of FIG. 2).

At block 558, an existing voice-based trigger may be selected from descriptive linguistics library 84 based at least in part on a measure of similarity between the voice command received at block 552 and the selected voice-based trigger. As noted elsewhere herein, this measure of similarity may be indicative of semantic and/or syntactic similarity. In some implementations, a context of the user who issued the voice command may also be considered when selecting the voice-based trigger.

At block 560, one or more responsive actions associated with the voice-based trigger selected at block 558 may be determined. In some implementations, a voice-based trigger may be associated with multiple distinct candidate responsive actions (as was the case in FIG. 4). In some such implementations, a user's context may be used to select a candidate responsive action from the multiple candidate responsive actions. In other implementations, the most-commonly executed responsive action(s) (e.g., those executed by the greatest number of client devices in response to the voice-based trigger, or those executed by the greatest percentage of all client devices in response to the voice-based trigger) may be selected.

At block 562, one or more current responsive actions to be performed by the client device at which the voice command was received at block 552 may be selected based on the responsive actions determined at block 560. For example, a plurality of applications installed on the client device at which the voice command was issued may be analyzed to identify one or more applications to perform the one or more current responsive actions. In some implementations, if the same applications are installed, the one or more current responsive actions may be the same as the one or more responsive actions. On the other hand, if the same applications are not installed on the client device at which the voice command was issued, then in some implementations, the one or more current responsive actions may be analogous to the one or more responsive actions determined at block 560. "Analogous" responsive actions may include those responsive actions that are performed using "analogous" applications, rather than the exact same applications, as previous responsive actions.

In some implementations, responsive actions may require one or parameters. At optional block 563, these parameters may be selected by the interactive assistant module. In some cases, these parameters may be provided explicitly by the user (e.g., "Order me a large thin-crust sausage pizza from Hypothetical Pizza"). In some implementations, the user may even be prompted for parameters. For example, voice-based triggers may, over time, be added to descriptive linguistics library 84 that include terms and phrases commonly used by users (so-called "fixed content") in combination with specific parameters that refer to a particular entity/datum (so-called "transient content"). For example, a common voice-based trigger may be "Order me a <size> <crust type> <topping> pizza from <location>." When a user issues a command, "order me a pizza," that command may be matched to the aforementioned user-voice-based trigger, and the user may be prompted, e.g., by the interactive assistant module, to provide the missing parameters (e.g., "what kind of crust?", "what size?", "what topping?", etc.).

In other cases, parameters required for one or more responsive actions may be selected automatically by the interactive assistant module, e.g., based on the user's context, prior user voice commands, etc. For example, suppose a user issues the voice command, "Order me a pizza." The interactive assistant module may search the user's pizza ordering history (e.g., using electronic receipts sent via email, or past voice commands that were more specific) to automatically select a type of pizza to order. In some instances, similar techniques may be used to identify a pizza restaurant from which to order the pizza. In other implementations, the interactive assistant module may determine the user's current location (e.g., from a position coordinate sensor built into the user's phone or watch) and may select the closest pizza restaurant, the closest pizza restaurant from which the user has previously ordered, the pizza restaurant from which the user most commonly orders, and so forth.

At block 564, the interactive assistant module may perform the one or more current responsive actions selected at block 562 (with parameters selected at block 563, where applicable). At block 566, user feedback may be received regarding performance of the current responsive action(s) at block 564. Feedback may be deemed positive, negative, or in some instances, neutral, depending on the circumstances. For example, if the current responsive actions include soliciting some kind of input from the user that relates to the current responsive actions (e.g., a parameter required to complete the current responsive actions), and the user provides the solicited input, that may be deemed positive feedback. If the current responsive actions include rendering some sort of media content (e.g., playing video, playing music, etc.), and the user consumes the content (e.g., as detected by the user not closing or minimizing the media player), that also may be deemed positive feedback, or in some cases, neutral feedback. In some implementations, the interactive assistant module may prompt the user to provide feedback, e.g., before performing the responsive actions as a request for permission or after as a request for feedback. If the user provides permission to perform the responsive actions or provides approving feedback, that may be deemed positive feedback.

By contrast, if the current responsive actions include soliciting some kind of input from the user that relates to the responsive actions (e.g., a parameter required to complete the responsive actions), and the user declines to provide the solicited input, that may be deemed negative feedback. If the current responsive actions include rendering some sort of media content (e.g., playing video, playing music, etc.), and the user quickly closes or minimizes the media player, that also may be deemed negative feedback. As noted above, in some implementations, the interactive assistant module may prompt the user to provide feedback, e.g., before performing the responsive actions or after. If the user refuses permission to perform the responsive actions or provides negative feedback, that may be deemed negative feedback.

At block 568, the interactive assistant module may determine whether the voice command received at block 552 is a new voice command (i.e., does not precisely match a voice-based trigger stored in the descriptive linguistics library 84). If the answer is no, then method 550 may proceed to block 570. At block 570, a strength of an association between the voice-based trigger that was selected at block 558 and the responsive actions determined at block 560 may be altered based on the feedback received at block 566. For example, if the user provides positive feedback in response to performance of the current responsive actions, a count corresponding to the association may be incremented, e.g., by one. Likewise, if the user provides negative feedback in response to performance of the current responsive actions, a count corresponding to the association may be decremented, e.g., by one. In other implementations, another instance of the voice-based trigger being used to trigger the associated voice commands may be added to a database, e.g., as a new record. Additionally or alternatively, a weight assigned to the association between the voice-based trigger and the responsive actions determined at block 560 may be increased or decreased, respectively, based on whether the feedback received at block 566 is positive or negative.

At block 572, it may be determined whether the current responsive actions selected at block 562 and performed at block 564 were analogous responsive actions, such as actions "analogous" to the responsive actions determined at block 560, as opposed to the same responsive actions that were determined at block 560. For example, if the client device has the same application(s) installed and is therefore able to perform the exact same responsive actions as were associated with the voice-based trigger selected at block 558, then the answer at block 572 may be no. However, if the client device does not have the same applications installed and instead performed the responsive actions using analogous applications that provide similar functionality, then the answer at block 572 may be no.

If the answer at block 572 is no, then method 550 may end. However, if the answer at block 572 is yes, then method 550 may proceed to block 574. At block 574, a new association between the voice-based trigger and the current responsive actions performed at block 564 using an analogous application(s) may be added to the descriptive linguistics library 84. In some implementations, this may be in addition to the alteration of the existing association between the voice-based trigger and the existing responsive actions performed at block 570. In other implementations, if the current responsive actions performed by the client device are not exactly (or sufficiently) the same as those already associated with the selected voice-based trigger, then block 570 may be omitted.

Back at block 568, if the voice command issued by the user does not precisely match an existing voice-based trigger in the descriptive linguistics library 84, then method 550 may proceed to block 576. At block 576, the voice command received at block 552 may be added to the descriptive linguistics library 84 as a new voice-based trigger. Method 550 may then proceed to block 574, at which point an association between the newly-added voice-based trigger and the current responsive actions performed at block 564 may be added to the descriptive linguistics library.

While implementations described above have related to an evolving descriptive linguistic library 84 that is available to a population of users, this is not meant to be limiting. In some implementations, as noted above, a "personal" descriptive linguistic library 77 may be maintained for a particular user (or a group of users, such as co-workers, family, friends, etc.). "Personal" descriptive linguistic library 77 may be stored locally in one or more clients devices operated by a user for which the library is maintained, but that is not required. In some implementations, personal descriptive linguistics library 77 may be stored elsewhere (e.g., on the cloud), for instance as a portion of descriptive linguistics library 84 that is available only to that user.

In some implementations, personal descriptive linguistics library 77 may be used in a manner similar as described above with the "global" descriptive linguistics library 84, but may also provide additional functionality that is specific to a particular user (or group of users). A user may define (manually or learned from different voice commands over time) particular terms that have a specific meaning when used by the user as part of a voice command.

For instance, a user may issue a voice command such as "Send the following message to the team: xxxxx." The "team" in this context may be identified as a particular set of other users that the user previously defined (e.g., manually or automatically through prior voice commands), and in some instances may include particular identifiers (email addresses, phone numbers to receive text messages, social networking monikers, etc.) that can be used to correspond with the members of the team.

As another example, contacts of a user may be automatically associated with various terms based on their relationship with the user and/or each other. For instance, contacts who are also members of the user's family may automatically be associated with the spoken word "family." Contacts who are also co-workers of the user may automatically be associated with the spoken word "co-workers." Thus, when a user issues a command, "Send my profile pic to my family," the interactive assistant module may automatically associate the term "family" with contacts of the user who are members of the user's family.

"Personal" descriptive linguistics library 77 additionally or alternatively may be used to populate various parameters (i.e., transient content) of one or more responsive actions, as was described above with respect to block 563 of FIG. 5. Suppose a user issues the voice command, "take me to the coffee shop." The more generic command "take me to a coffee shop" may trigger responsive actions such as opening up a navigation application with directions to the nearest coffee shop. However, the command issued by the user mentions "the coffee shop," which suggests the user has a particular coffee shop in mind. In such instance, the interactive assistant module may search voice-based triggers in the user's personal descriptive linguistics library 77, and/or a particular context of the user, to identify which coffee shop the user referred to when the user said "the coffee shop." A navigational application may then be triggered with directions to that specific coffee shop, regardless of whether there are other closer coffee shops.

It will be appreciated that improved device performance is a facet of the above description. For example, in permitting recognition of otherwise ambiguous user voice commands, the quantity of voice commands re-issued by a user, and/or clarifying questions issued by a system, are reduced. This reduces bandwidth and data usage in a client-server model, and reduces demands on computation resources, memory usage, and battery use in a client or local device. Furthermore, once a long-tail voice command is successfully associated with an action, that command can quickly be executed in the future (for that user and/or other users), reducing the computation and communication demands on a server device.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method comprising:
   receiving, at a client device, a given voice command from a user;
   selecting, from a library of voice-based triggers previously used across a population of users, a selected voice-based trigger, wherein the library includes one or more associations between each respective voice-based trigger of the library of voice-based triggers and one or more responsive actions previously invoked automatically by one or more other client devices operated by one or more other users of the population of users in response to the respective voice-based trigger, and wherein the selecting is based at least in part on a measure of similarity between the given voice command and the selected voice-based trigger;
   determining the one or more responsive actions associated with the selected voice-based trigger in the library;
   identifying an application previously executed by one or more of the other client devices to perform the one or more responsive actions associated with the selected voice-based trigger in the library;
   analyzing a plurality of distinct applications installed on the client device;
   determining, based on the analyzing, that the application previously executed by the one or more of the other client devices to perform the one or more responsive actions is not currently installed on the client device;
   identifying, based on the analyzing, an analogous application to the application previously executed by the one or more of the other client devices;
   invoking, by the client device, the analogous application to perform the one or more responsive actions associated with the selected voice-based trigger;
   receiving, by the client device from the user, feedback associated with the client device invoking the analogous application to perform the one or more responsive actions; and
   altering a strength of an association between the selected voice-based trigger and the one or more responsive actions based on the feedback, wherein the altering includes incrementing a count corresponding to the strength of association when the feedback is positive and decrementing the count when the feedback is negative;
   wherein the selected voice-based trigger is selected from the library of voice-based triggers further based on a context of the user detected using one or more sensors of the client device.

2. The method of claim 1, wherein determining the one or more responsive actions associated with the selected voice-based trigger in the library comprises selecting at least one of the responsive actions from a plurality of candidate responsive actions associated with the selected voice-based trigger in the library.

3. The method of claim 2, wherein the at least one responsive action is selected based on the context of the user.

4. The method of claim 1, wherein the selected voice-based trigger includes one or more terms or tokens that are analogous to one or more terms or tokens in the given voice command.

5. The method of claim 1, wherein the altering comprises weakening the association between the selected voice-based trigger and the one or more responsive actions based on the feedback.

6. The method of claim 1, wherein the altering comprises strengthening the association between the selected voice-based trigger and the one or more responsive actions based on the feedback.

7. The method of claim 1, wherein the measure of similarity is a measure of syntactic similarity.

8. The method of claim 1, wherein the measure of similarity is a measure of semantic similarity.

9. The method of claim 1, wherein the given voice command fails to specify at least one parameter required by the one or more responsive actions, and the method further includes identifying, based on the context of the user, a value to use as the at least one parameter.

10. The method of claim 1, wherein the given voice command fails to specify at least one parameter required by the one or more responsive actions, and the method further includes identifying, based on a personal library associated with the user, a value to use as the at least one parameter.

11. A system comprising one or more processors and memory operably coupled with the one or more processors, wherein the memory stores instructions that, in response to execution of the instructions by one or more processors, cause the one or more processors to operate an interactive assistant module configured to:
   receive a given voice command from a user;
   select, from a library of voice-based triggers previously used across a population of users, a selected voice-based trigger, wherein the library includes one or more associations between each respective voice-based trigger of the library of voice-based triggers and one or more responsive actions previously invoked automatically by one or more other client devices operated by one or more other users of the population of users in response to the respective voice-based trigger, and wherein the selecting is based at least in part on a measure of similarity between the given voice command and the selected voice-based trigger;
   determine the one or more responsive actions associated with the selected voice-based trigger in the library;
   identify an application previously executed by one or more of the other client devices to perform the one or more responsive actions associated with the selected voice-based trigger in the library;
   analyze a plurality of distinct applications installed on the client device;
   determine, based on the analysis, that the application previously executed by the one or more of the other client devices to perform the one or more responsive actions is not currently installed on the client device;
   identify, based on the analysis, an analogous application to the application previously executed by the one or more of the other client devices;
   invoke the analogous application to perform the one or more responsive actions associated with the selected voice-based trigger;

receive, from the user, feedback associated with the one or more processors invoking analogous application to perform the one or more responsive actions; and alter a strength of an association between the selected voice-based trigger and the one or more responsive actions based on the feedback, wherein the alteration includes incrementing a count corresponding to the strength of association when the feedback is positive and decrementing the count when the feedback is negative;

wherein the selected voice-based trigger is selected from the library of voice-based triggers further based on a context of the user detected using one or more sensors of the system.

12. The system of claim 11, wherein the interactive assistant module is further configured to weaken the association between the selected voice-based trigger and the one or more responsive actions based on the feedback.

13. The system of claim 11, wherein the given voice command fails to specify at least one parameter required by the one or more responsive actions, and the method further includes identifying, based on the context of the user or based on a personal library associated with the user, a value to use as the at least one parameter.

14. A method comprising:

receiving, from a population of users, a plurality of voice-based triggers and responsive actions invoked automatically at client devices operated by users of the population of users in response to the voice-based triggers;

storing associations between the voice-based triggers and the responsive actions in a library, wherein the associations are endorsed by the population of users;

receiving a new voice command provided by a given user at a given client device;

selecting, from the library of voice-based triggers, a selected voice-based trigger, wherein the selecting is based at least in part on a measure of similarity between the new voice command and the selected voice-based trigger and on a context of the given user detected using one or more sensors of the given client device;

determining one or more responsive actions associated with the selected voice-based trigger in the library;

identifying an application previously executed by one or more of the client devices operated by users of the population of users to perform the one or more responsive actions associated with the selected voice-based trigger in the library;

determining that the application previously executed by the one or more of the client devices operated by users of the population of users to perform the one or more responsive actions is not currently installed on the given client device;

identifying, to the given client device, an analogous application to the application previously executed by the one or more of the other client devices, to trigger the given client device to execute the analogous application to perform the one or more responsive actions;

receiving, by the client device based on input from the user, feedback associated with the given client device invoking the one or more responsive actions; and altering a strength of an association between the selected voice-based trigger and the one or more responsive actions based on the feedback, wherein the altering includes incrementing a count corresponding to the strength of association when the feedback is positive and decrementing the count when the feedback is negative.

* * * * *